(12) United States Patent
Tsai et al.

(10) Patent No.: US 6,176,652 B1
(45) Date of Patent: Jan. 23, 2001

(54) DRILLING MACHINE WITH VACUUM SUCTION TABLE

(75) Inventors: Huo-Chen Tsai; Shih-Chung Chang; Wen-Chih Sung; Li-Na Chang, all of Taipei (TW)

(73) Assignee: Chunghwa Picture Tubes, Ltd., Taipei (TW)

( * ) Notice: Under 35 U.S.C. 154(b), the term of this patent shall be extended for 0 days.

(21) Appl. No.: 09/349,724

(22) Filed: Jul. 8, 1999

(51) Int. Cl.[7] .................................................. B23B 39/18
(52) U.S. Cl. .................... 408/46; 269/21; 408/56; 408/99; 408/234; 408/241 S
(58) Field of Search ................... 408/46, 53, 56, 408/88, 99, 101, 110, 137, 234, 241 S; 269/21

(56) References Cited

U.S. PATENT DOCUMENTS

| | | | |
|---|---|---|---|
| 1,958,552 | * | 5/1934 | Thomas ................................... 408/46 |
| 3,073,023 | * | 1/1963 | Koeppen ............................. 408/110 |
| 3,290,966 | * | 12/1966 | Gesko ..................................... 408/46 |
| 3,822,958 | * | 7/1974 | Lewis ..................................... 408/46 |
| 4,066,249 | * | 1/1978 | Huber et al. ........................... 269/21 |
| 4,090,803 | * | 5/1978 | Haley ..................................... 408/46 |
| 5,024,562 | * | 6/1991 | Arai et al. ............................. 408/1 R |
| 5,163,789 | * | 11/1992 | Weber et al. ........................... 408/27 |
| 5,277,524 | * | 1/1994 | Chung .................................... 408/53 |
| 5,487,536 | * | 1/1996 | McEachin .............................. 269/21 |
| 5,538,579 | * | 7/1996 | Ishimura et al. ..................... 156/250 |
| 5,671,910 | * | 9/1997 | Davies et al. .......................... 269/21 |
| 6,039,514 | * | 3/2000 | O'Donovan et al. .................. 408/53 |

FOREIGN PATENT DOCUMENTS

06246566 * 9/1994 (JP) ....................................... 269/21

* cited by examiner

Primary Examiner—A. L. Wellington
Assistant Examiner—Monica S. Carter
(74) Attorney, Agent, or Firm—Bacon & Thomas, PLLC

(57) ABSTRACT

A drilling machine primarily employed in drilling holes in a glass plate comprises a vacuum suction table for putting a glass plate thereon, a plurality of fasteners to fasten vacuum suction table on the glass plate, an adjusting screw for precisely positioning drill seat to above a desired position, a motor drive to provide a power for enabling drill to move downwardly to drill, and a lubricating device for feeding lubricating oil on drill during operation for decreasing drill temperature and dust occurred. With the drilling machine, a quality product with high precision as well as increasing efficiency and safety are realized.

6 Claims, 3 Drawing Sheets

DRILLING MACHINE WITH VACUUM SUCTION TABLE

FIELD OF THE INVENTION

The present invention relates to a drilling machine, and more particularly to a drilling machine with vacuum suction table for precisely positioning.

BACKGROUND OF THE INVENTION

Typically, a conventional drilling machine comprises a base, a plurality of fasteners provided on base for fastening a glass plate on base, and a drill. Generally, it manually fastens a glass plate on base and then manually position a drill to above base prior to conducting a high-speed drilling process on the glass plate. It is seen that such manual fastening and positioning are not reliable and time consuming which further results in a short furlike glass edge, glass break, error, etc. occurred in an unfinished product during the drilling process. As such, a poor finished product with low precision is produced after a liquid crystal applying process. To the worse, it is possible for drill to penetrate through glass plate to damage drill and base both.

A need remains for an improved drilling machine with vacuum suction table to overcome the above drawbacks of prior art.

SUMMARY OF THE INVENTION

It is an object of the present invention to provide a drilling machine comprising a vacuum suction table for putting a glass plate thereon, a plurality of fasteners to fasten vacuum suction table on the glass plate, an adjusting screw for precisely positioning drill seat to above a desired position, a motor drive to provide a power for enabling drill to move down and conduct a high-speed drilling process, and a lubricating device for feeding lubricating oil on drill during operation so as to decrease drill temperature and dust occurred. With the improved drilling machine, numerous disadvantages of prior art, such as a short furlike edge formed on glass plate, glass break, and error, are eliminated, while providing a quality product with high precision as well as increasing efficiency and safety.

The above and other objects, features and advantages of the present invention will become apparent from the following detailed description taken with the accompanying drawings.

DETAILED DESCRIPTION OF PREFERRED EMBODIMENTS

Figure 1:
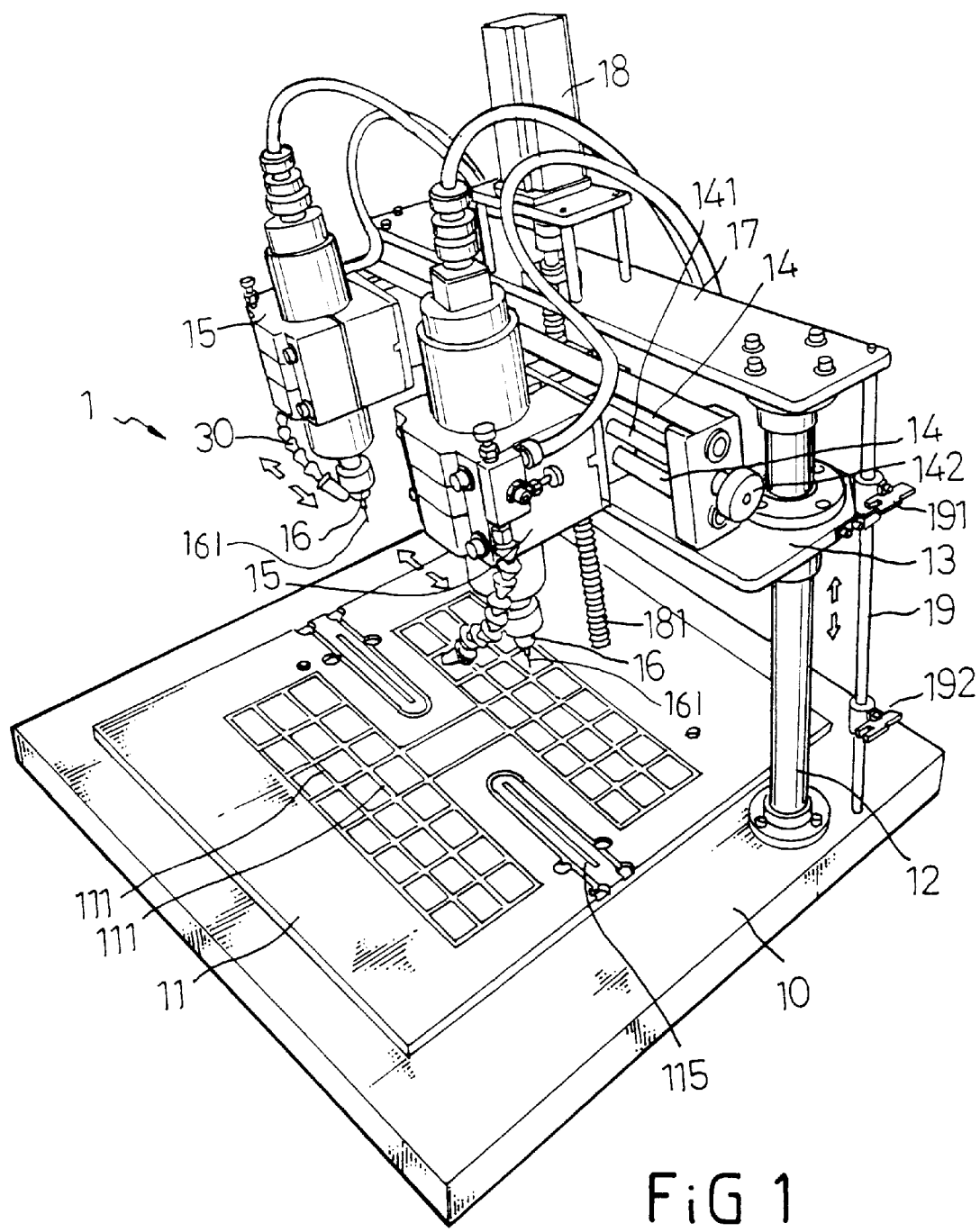
FIG. 1 is a perspective view of the invention.
Figure 2:
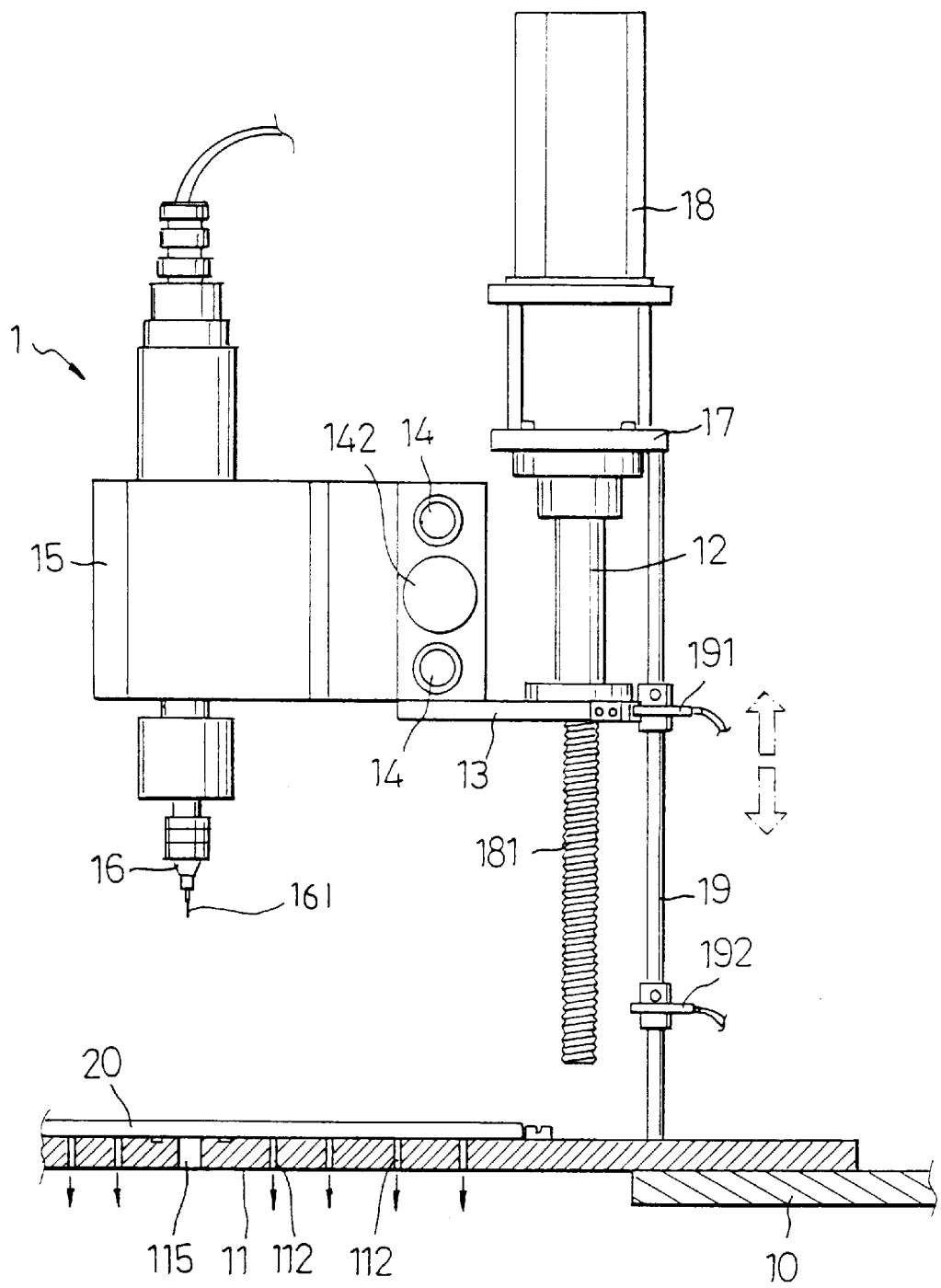
FIG. 2 is a cross-sectional view of FIG. 1.
Figure 3:
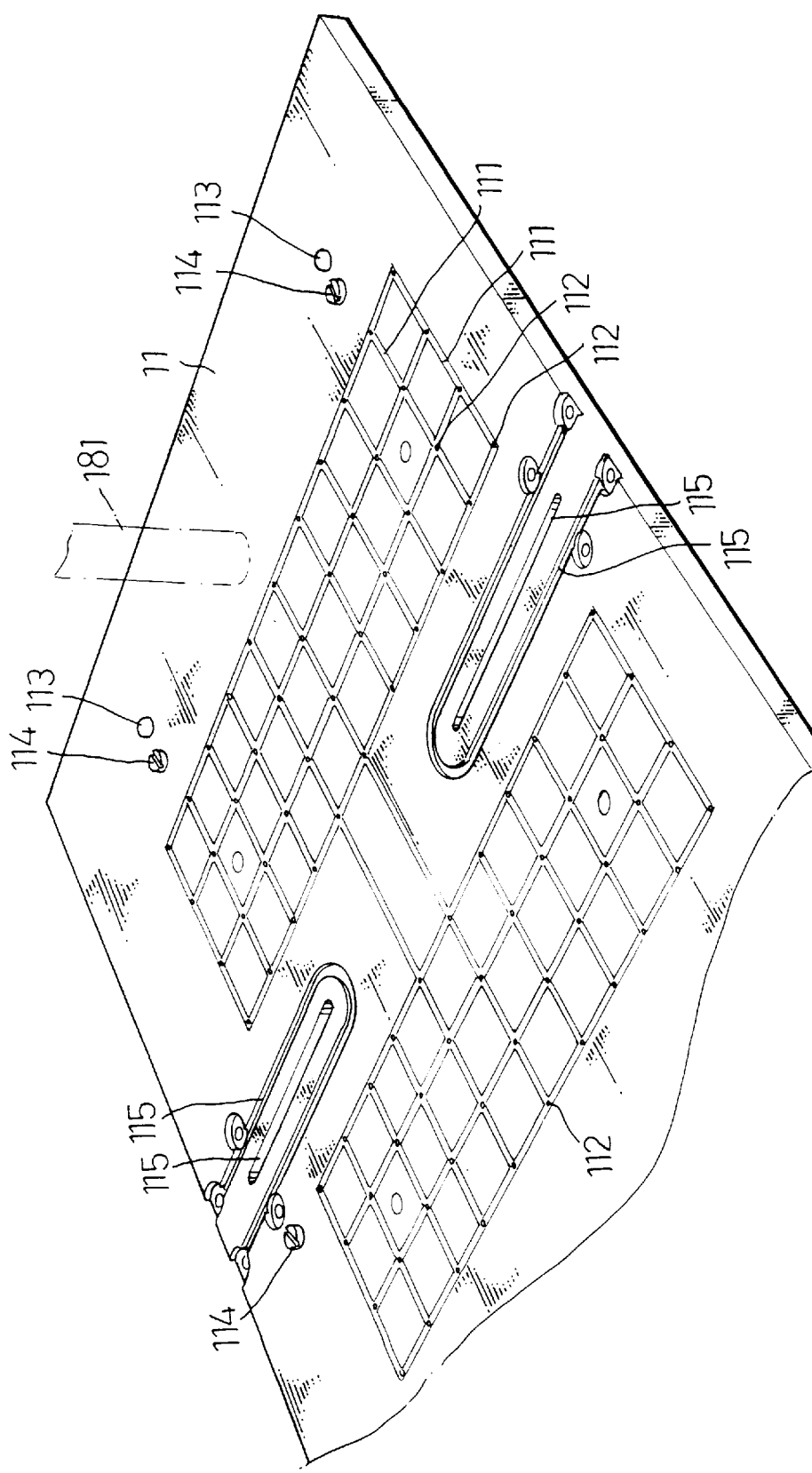
FIG. 3 is an enlarged perspective view of vacuum suction table of FIG. 1.

Referring to FIGS. 1–3, there is shown a drilling machine 1 according to the invention for drilling holes on a glass plate 20. The drilling machine 1 comprises a base 10; a generally rectangular table 11 having a plurality of longitudinal and transverse grooves 111 and a plurality of through holes 112 each provided on an intersection of a longitudinal and transverse grooves 111; a suction plate (not shown) below table 11 for forming a strong vacuum suction in conjunction with grooves 111 and through holes 112; a plurality of holes 113 provided around grooves 111; a plurality of fasteners 114 provided near holes 113 for positioning glass plate 20 on the base 10; two pairs of elongated slots 115 each pair having two slots 115; a pair of columns 12 provided on two opposite sides of base 10; a first platform 13 provided between columns 12 and being slidable along columns 12; at least one horizontal sliding rod 14 and a first adjusting screw 141 provided on first platform 13; at least one drill seats (two are shown) 15 each having a jaw 16 are slidingly movable along sliding rods 14 and first adjusting screw 141; an adjustment knob 142 provided on an external side of first adjusting screw 141 for providing a lateral movement adjustment of drill seats 15 on the sliding rods 14 to a desired position; a second platform 17 parallel to first platform 13 terminated on two top ends of columns 12; a motor drive 18 positioned above second platform 17 having a second adjusting screw 181 extended from bottom of motor drive 18 to penetrate through second and first platforms 17 and 13 terminated on base 10 for enabling first platform 13 and drill seats 15 slidingly movable along second adjusting screw 181 and columns 12; a pair of depth stop posts 19 each provided adjacent to column 12 having an adjustable upper and lower depth stops 191 and 192 for allowing first platform 13 as well as drill seats 15 to vertically move between the height delimited by upper and lower depth stops 191 and 192 in order to prevent drill 161 from penetrating through glass plate 20 for protecting drill 161 and table 11; and a pair of lubricating devices 30 each feeding lubricating oil on the drill during operation for decreasing drill temperature and dust occurred.

In operation, table 11 and glass plate 20 are positioned by fasteners 114 on base 10 and further secured by a vacuum suction plane provided by suction plate through longitudinal and transverse grooves 111. Then, adjust adjustment knob 142 to laterally move jaw 16 to above a desired position and consequently, motor drive 18 enables first platform 13 and drill seat 15 to move downwardly along columns 12 and second adjusting screw 181 respectively, resulting in drill 161 to drill through glass plate 20. As stated above, each lubricating device 30 continuously feeds lubricating oil on drill 161 during the operation for decreasing drill temperature and dust occurred, while used lubricating oil and scrap flowing into slots 115 to exit. Finally, motor drive 18 enables first platform 13 and drill 161 to move up along columns 12 and second adjusting screw 181 respectively toward upper depth stop 191 in response to first platform 13 reaching the lowest point set by lower depth stop 192 so as to finish the drilling process.

While the invention herein disclosed has been described by means of specific embodiments, numerous modifications and variations could be made thereto by those skilled in the art without departing from the scope of the invention set forth in the claims.

What is claimed is:

1. A drilling machine for drilling holes in a glass plate comprising:

a base;

a vacuum suction table provided on the base having a plurality of longitudinal and transverse grooves and a plurality of through holes each provided on an intersection of each longitudinal groove and each transverse groove;

one or more columns provided on two opposite sides of base;

a first platform provided between columns and being slidable along columns;

one or more horizontal sliding rods and a first adjusting screw provided on the first platform;

one or more drill seats slidingly movable along the sliding rods and the first adjusting screw;

an adjustment knob provided on an external side of the first adjusting screw for providing a lateral movement adjustment of drill seats on the sliding rods;

a second platform parallel to the first platform terminated on two top ends of columns; and a motor drive means positioned above the second platform having a second adjusting screw extended from bottom of motor drive means to penetrate through the second and the first platforms terminated on the base for enabling the first platform and drill seats slidingly movable along the second adjusting screw and the columns;

wherein the glass plate is secured on the table by a suction force, thereby enabling a drill to laterally and longitudinally adjust to a predetermined position.

2. The drilling machine of claim 1, wherein the suction force is formed by a suction plate below the table in conjunction with the longitudinal and the transverse grooves and the through holes.

3. The drilling machine of claim 1, further comprising a plurality of holes provided around grooves, and a plurality of fasteners provided adjacent to each of the holes for positioning the glass plate on the base.

4. The drilling machine of claim 1, further comprising a pair of depth stop posts each provided adjacent to one of the columns having an adjustable upper and lower depth stops and for allowing the first platform and the drill seats to vertically move between a height delimited by the upper and lower depth stops in order to prevent the drill from penetrating through the glass plate to come to contact with the table.

5. The drilling machine of claim 1, further comprising a lubricating device for feeding a lubricating oil on the drill during operation for decreasing temperature and dust.

6. The drilling machine of claim 1, further comprising two pairs of elongated slots each pair having two slots for exiting a scrap.

* * * * *